United States Patent
Montojo et al.

(10) Patent No.: US 10,433,282 B2
(45) Date of Patent: Oct. 1, 2019

(54) NARROW BANDWIDTH OPERATION IN LTE

(71) Applicant: QUALCOMM INCORPORATED, San Diego, CA (US)

(72) Inventors: Juan Montojo, San Diego, CA (US); Jelena M. Damnjanovic, Del Mar, CA (US); Hao Xu, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 14/956,306

(22) Filed: Dec. 1, 2015

(65) Prior Publication Data

US 2016/0088592 A1  Mar. 24, 2016

Related U.S. Application Data

(63) Continuation of application No. 13/612,503, filed on Sep. 12, 2012, now Pat. No. 9,241,287.
(Continued)

(51) Int. Cl.
*H04W 72/04* (2009.01)
*H04L 25/02* (2006.01)
(Continued)

(52) U.S. Cl.
CPC ......... *H04W 72/04* (2013.01); *H04L 25/0224* (2013.01); *H04L 27/0008* (2013.01);
(Continued)

(58) Field of Classification Search
CPC ............. H04W 28/20; H04W 36/0061; H04W 72/0453; H04W 48/12; H04W 72/1289;
(Continued)

(56) References Cited

U.S. PATENT DOCUMENTS 6,490,314 B1 * 12/2002 Khayrallah ............ H04B 1/707
375/131
6,539,050 B1   3/2003 Lee et al.
(Continued)

FOREIGN PATENT DOCUMENTS

EP      2346286 A1    7/2011
JP    2010506446 A    2/2010
(Continued)

OTHER PUBLICATIONS

Alcatel-Lucent, "Alcatel-Lucent Shanghai Bell", Component carrier types in LTE-A, R1-093764, 3GPP, Oct. 6, 2009.
(Continued)

*Primary Examiner* — Jae Y Lee
*Assistant Examiner* — Jean F Voltaire
(74) *Attorney, Agent, or Firm* — Anthony R. Morris

(57) ABSTRACT

A method of wireless communication provides narrow bandwidth operation within a wider LTE system bandwidth. Wideband information is transmitted to a first set of user equipments (UEs). Also, narrowband information is transmitted to a second set of UEs. The second set of UEs operate in a narrower bandwidth than the first set of UEs.

29 Claims, 10 Drawing Sheets

Related U.S. Application Data

(60) Provisional application No. 61/534,206, filed on Sep. 13, 2011.

(51) Int. Cl.
| | | |
|---|---|---|
| *H04W 52/14* | (2009.01) | |
| *H04W 52/26* | (2009.01) | |
| *H04L 27/00* | (2006.01) | |
| *H04W 52/24* | (2009.01) | |
| *H04W 48/12* | (2009.01) | |
| *H04W 36/00* | (2009.01) | |
| *H04L 5/00* | (2006.01) | |
| *H04W 28/20* | (2009.01) | |
| *H04W 72/12* | (2009.01) | |

(52) U.S. Cl.
CPC ....... *H04W 36/0061* (2013.01); *H04W 48/12* (2013.01); *H04W 52/143* (2013.01); *H04W 52/241* (2013.01); *H04W 52/265* (2013.01); *H04W 72/0453* (2013.01); *H04L 5/0007* (2013.01); *H04W 28/20* (2013.01); *H04W 72/1289* (2013.01)

(58) Field of Classification Search
CPC .. H04W 24/04; H04W 24/02; H04L 27/2647; H04L 2025/03057; H04L 2025/0349; H04B 1/1036; H04B 7/005
USPC ................ 370/252, 328, 329, 330, 331, 332
See application file for complete search history.

(56) References Cited

U.S. PATENT DOCUMENTS

| | | | | |
|---|---|---|---|---|
| 6,909,877 | B2* | 6/2005 | Rofheart | H04B 1/7172 375/280 |
| 7,525,942 | B2 | 4/2009 | Cordone et al. | |
| 7,751,364 | B2 | 7/2010 | Won et al. | |
| 8,081,722 | B1 | 12/2011 | Furman et al. | |
| 2005/0010958 | A1 | 1/2005 | Rakib et al. | |
| 2007/0047494 | A1* | 3/2007 | Cordone | H04B 1/1036 370/335 |
| 2007/0149155 | A1* | 6/2007 | Jorgenson | H04B 17/382 455/214 |
| 2007/0254679 | A1 | 11/2007 | Montojo et al. | |
| 2008/0159323 | A1 | 7/2008 | Rinne et al. | |
| 2008/0188266 | A1 | 8/2008 | Carter et al. | |
| 2008/0200146 | A1 | 8/2008 | Wang et al. | |
| 2009/0003477 | A1 | 1/2009 | Nishio et al. | |
| 2009/0022098 | A1 | 1/2009 | Novak et al. | |
| 2010/0029289 | A1 | 2/2010 | Love et al. | |
| 2010/0067418 | A1* | 3/2010 | Parkvall | H04W 68/02 370/311 |
| 2010/0195566 | A1 | 8/2010 | Krishnamurthy et al. | |
| 2010/0260081 | A1 | 10/2010 | Damnjanovic et al. | |
| 2010/0265862 | A1 | 10/2010 | Choi et al. | |
| 2010/0281323 | A1* | 11/2010 | Wang | H04B 7/15507 714/748 |
| 2010/0322154 | A1 | 12/2010 | Chen et al. | |
| 2010/0323627 | A1 | 12/2010 | Alanara | |
| 2010/0329384 | A1* | 12/2010 | Kwak | H04L 5/0007 375/295 |
| 2011/0051654 | A1* | 3/2011 | Blankenship | H04B 7/2606 370/315 |
| 2011/0076960 | A1 | 3/2011 | Yun et al. | |
| 2011/0085457 | A1 | 4/2011 | Chen et al. | |
| 2011/0111779 | A1 | 5/2011 | Krishnamurthy et al. | |
| 2011/0149890 | A1* | 6/2011 | Chun | H04L 5/0007 370/329 |
| 2011/0182376 | A1* | 7/2011 | Abe | H04L 5/0023 375/260 |
| 2011/0194534 | A1 | 8/2011 | Carmon et al. | |
| 2011/0200028 | A1 | 8/2011 | Suzuki et al. | |
| 2011/0205982 | A1* | 8/2011 | Yoo | H04L 1/0038 370/329 |
| 2011/0299489 | A1 | 12/2011 | Kim et al. | |
| 2012/0014320 | A1 | 1/2012 | Nam et al. | |
| 2012/0115485 | A1 | 5/2012 | Narasimha et al. | |
| 2012/0218952 | A1* | 8/2012 | Kwon | H04W 72/042 370/329 |
| 2013/0064119 | A1 | 3/2013 | Montojo et al. | |

FOREIGN PATENT DOCUMENTS

| | | |
|---|---|---|
| JP | 2010541367 A | 12/2010 |
| KR | 20100067893 A | 6/2010 |
| WO | 2007080892 A1 | 7/2007 |
| WO | 2008040448 A1 | 4/2008 |
| WO | 2009041779 A1 | 4/2009 |
| WO | 2010032374 A1 | 3/2010 |
| WO | 2010068066 A2 | 6/2010 |
| WO | 2010118382 A1 | 10/2010 |
| WO | WO/2010/118382 * | 10/2010 |
| WO | WO 2010/118382 A1 * | 10/2010 |
| WO | WO2010118382 A1 * | 10/2010 |
| WO | 2011100596 A2 | 8/2011 |

OTHER PUBLICATIONS

Fujitsu: "Inclusion of CIF in DCI format", R1-101311, 3GPP, Feb. 16, 2010.
Fujitsu: "On support of low-cost MTC terminals with reduced Tx/Rx bandwidths", 3GPP Draft; R1-112669, 3rd Generation Partnership Project (3GPP), Mobile Competence Centre ; 650, Route Des Lucioles ; F-06921 Sophia-Anti Polis Cedex; France, vol. RAN WG1, no. Athens, Greece; Aug. 22, 2011, Aug. 16, 2011 (Aug. 16, 2011), XP050537715, [retrieved on Aug. 16, 2011], p. 1.
International Search Report and Written Opinion—PCT/US2012/055180—ISA/EPO—dated Apr. 5, 2013.
Ipwireless Inc: "Proposal fora study item in support of low complexity LTE devices for MTC" , 3GPP Draft; R2-112974, 3rd Generation Partnershi P Project (3GPP) , Mobile Competence Centre ; 650, Route Des Lucioles ; F-06921 Sophia-Antipolis Cedex; France, vol . RAN WG2, no. Barcelona, Spain; May 9, 2011, Apr. 29, 2011 (Apr. 29, 2011), XP050494837, [retrieved on Apr. 29, 2011] paragraph 2.1.
Motorola Mobility, "Enhanced control channels for LTE Rel-11", R1-112446, 3GPP, Aug. 18, 2011.
Partial International Search Report—PCT/US2012/055180—ISA/EPO—Jan. 3, 2013.
Samsung: "PDCCH Extension to Support Operation with CI", R1-094082, 3GPP, Oct. 5, 2009.
IPWireless Inc., RAN impacts for the support of low complexity MTC devices, 3GPP TSG-RAN WG2#73bis R2-112403, Apr. 15, 2011, paragraph 2.3.

* cited by examiner

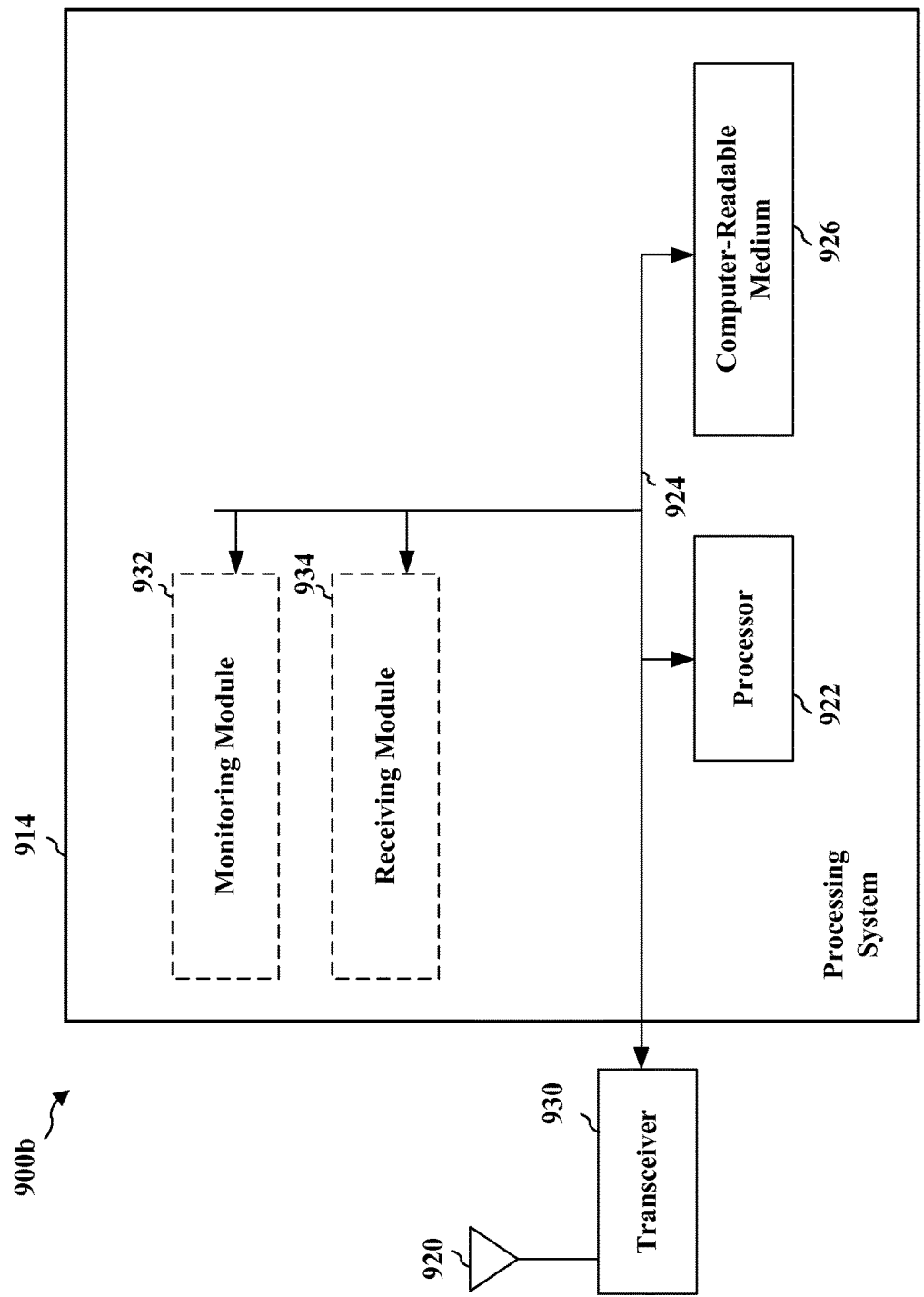

NARROW BANDWIDTH OPERATION IN LTE

CROSS-REFERENCE TO RELATED APPLICATIONS

This application is a continuation of U.S. patent application Ser. No. 13/612,503, entitled "Narrow Bandwidth Operation in LTE," filed on Sep. 12, 2012, which claims the benefit under 35 U.S.C. § 119(e) to U.S. Provisional Patent Application No. 61/534,206, entitled "Narrow Bandwidth Operation in LTE," filed on Sep. 13, 2011, the disclosures of which are expressly incorporated by reference herein in their entireties.

BACKGROUND

Field

Aspects of the present disclosure relate generally to wireless communication systems, and more particularly to narrow bandwidth operation within a wider LTE (long term evolution) system bandwidth.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect, a method of wireless communication is disclosed. The method includes transmitting wideband information to a first set of user equipments (UEs), and transmitting narrowband information to a second set of UEs. The second set of UEs operates in a narrower bandwidth than the first set of UEs.

Another aspect discloses wireless communication having a memory and at least one processor coupled to the memory. The processor(s) is configured to transmit wideband information to a first set of user equipments (UEs). The processor(s) is also configured to transmit narrowband information to a second set of UEs, in which the second set of UEs operates in a narrower bandwidth than the first set of UEs.

Another aspect discloses a computer program product for wireless communications in a wireless network having a non-transitory computer-readable medium. The computer readable medium has non-transitory program code recorded thereon which, when executed by the processor(s), causes the processor(s) to perform operations of transmitting wideband information to a first set of user equipments (UEs). The program code also causes the processor(s) to transmit narrowband information to a second set of UEs, in which the second set of UEs operate in a narrower bandwidth than the first set of UEs.

Another aspect discloses an apparatus for wireless communication including means for transmitting wideband information to a first set of user equipments (UEs). The apparatus also includes means for transmitting narrowband information to a second set of UEs. The second set of UEs operates in a narrower bandwidth than the first set of UEs.

In another aspect, a method of wireless communication by a narrowband device operating in a system including a wider bandwidth is disclosed. The method includes monitoring only a portion of the wider bandwidth. The method also includes receiving narrowband information in the monitored portion of bandwidth.

Another aspect discloses wireless communication by a narrowband device operating in a system including a wider bandwidth and includes a memory and at least one processor coupled to the memory. The processor(s) is configured to monitor only a portion of the wider bandwidth. The processor(s) is also configured to receive narrowband information in the monitored portion of bandwidth.

Another aspect discloses a computer program product for wireless communications by a narrowband device operating in a system including a wider bandwidth. The computer program product has a non-transitory computer-readable medium. The computer readable medium has non-transitory program code recorded thereon which, when executed by the processor(s), causes the processor(s) to perform operations of monitoring only a portion of the wider bandwidth. The program code also causes the processor(s) to receive narrowband information in the monitored portion of bandwidth.

Another aspect discloses an apparatus for wireless communication by a narrowband device operating in a system including a wider bandwidth and includes means for monitoring only a portion of the wider bandwidth. The program code also causes the processor(s) to receive narrowband information in the monitored portion of bandwidth.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 9A and 9B are block diagrams illustrating different modules/means/components in an exemplary apparatus.

DETAILED DESCRIPTION

Figure 1:
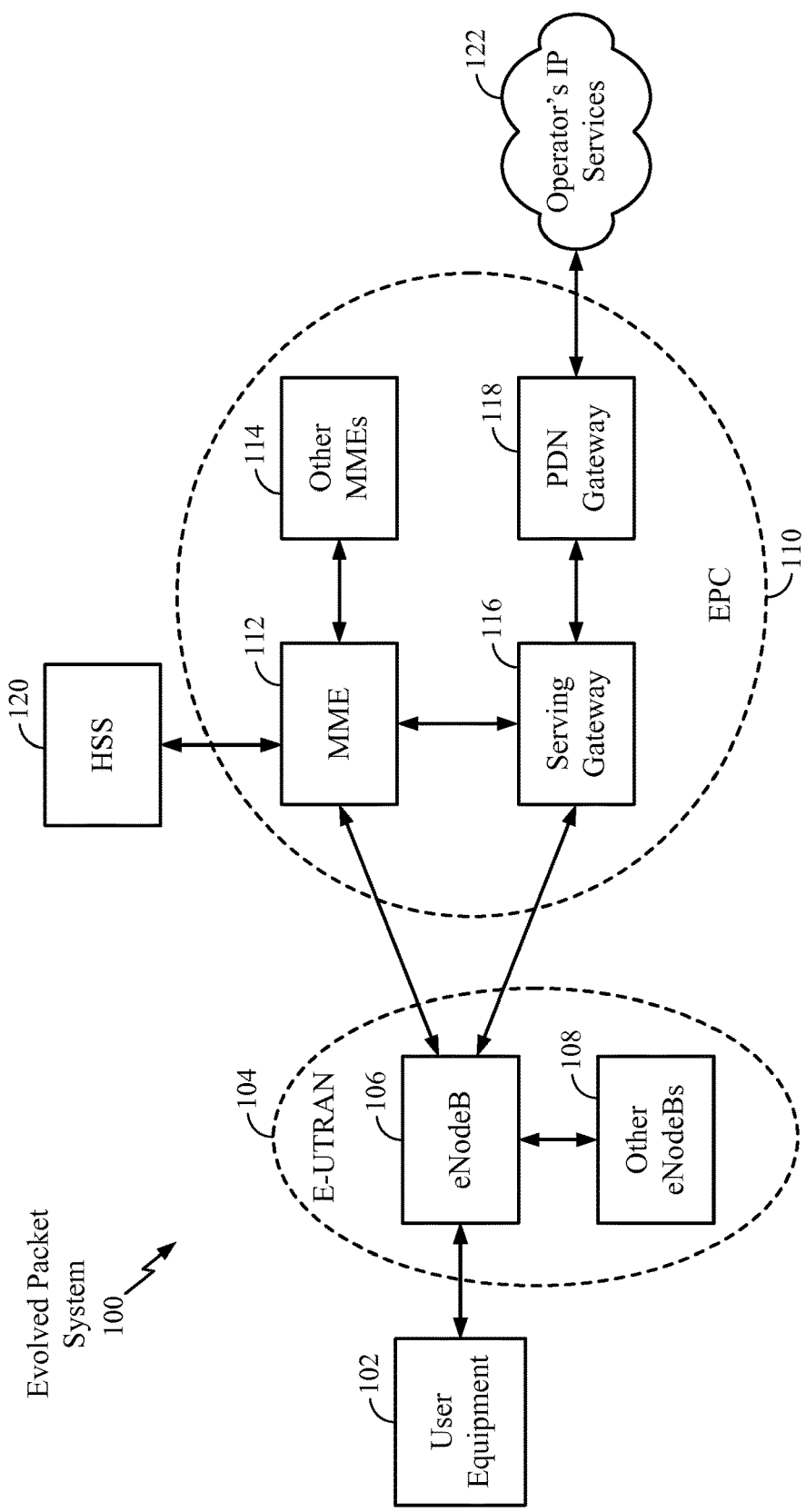
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
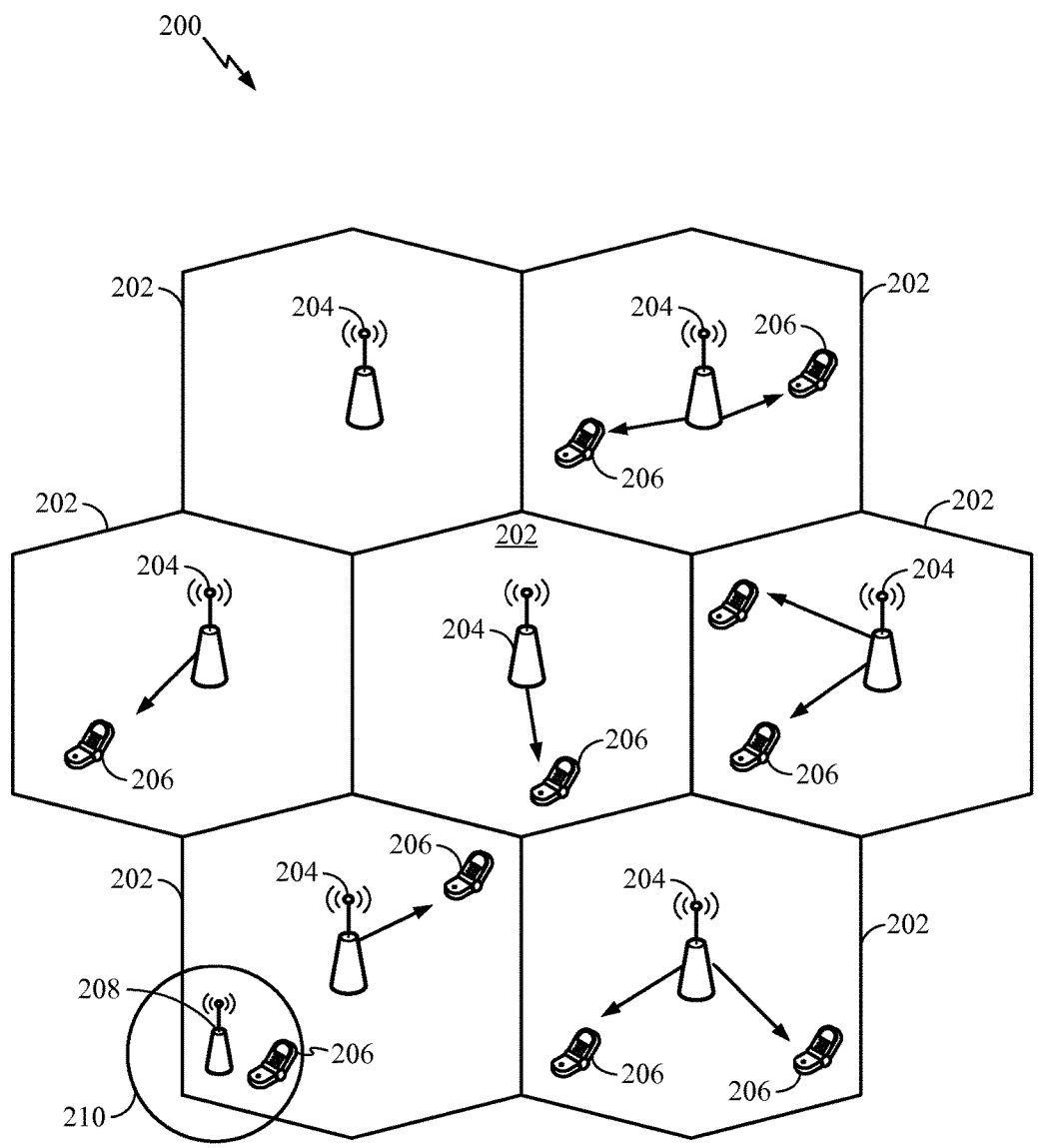
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
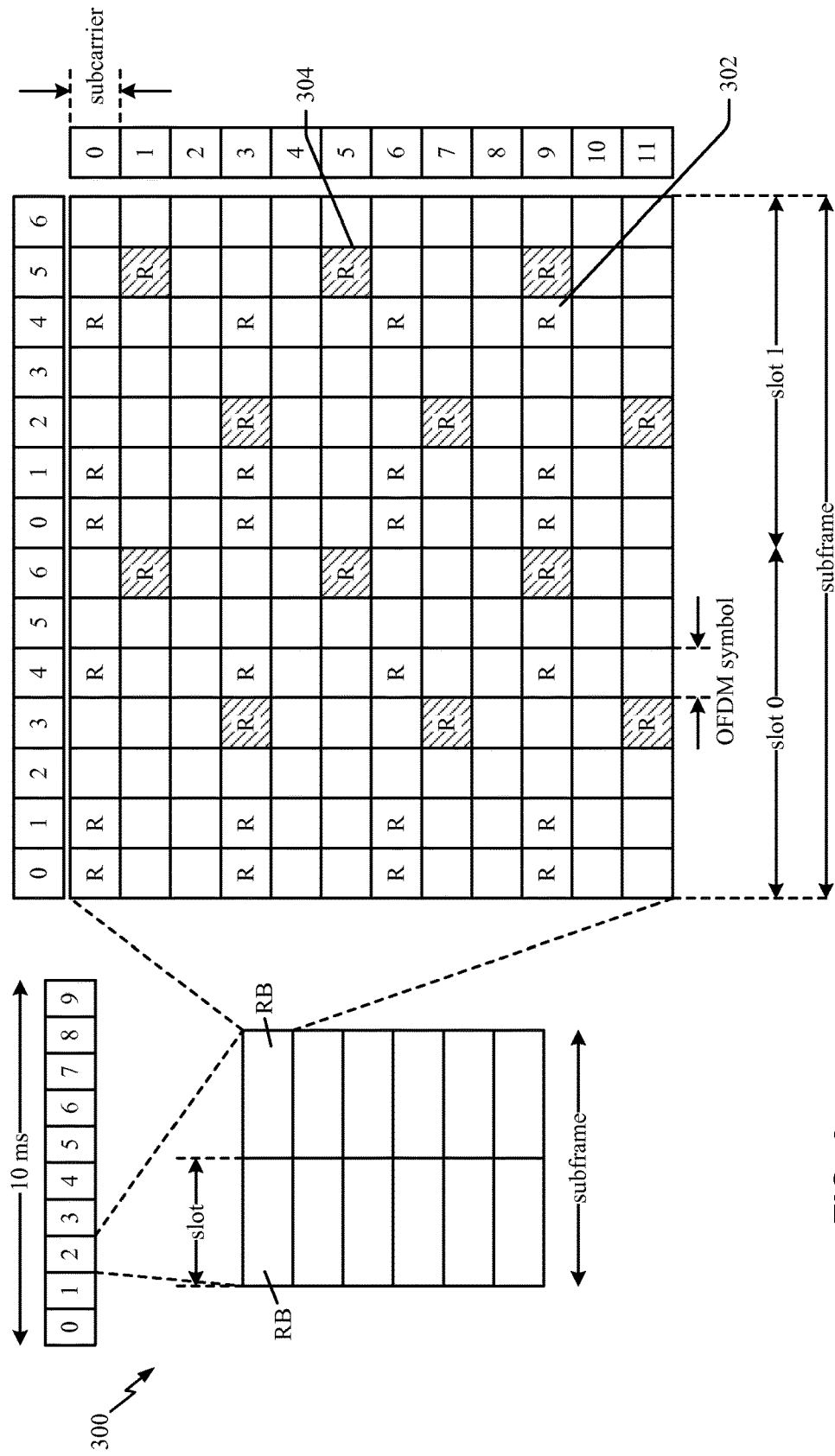
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
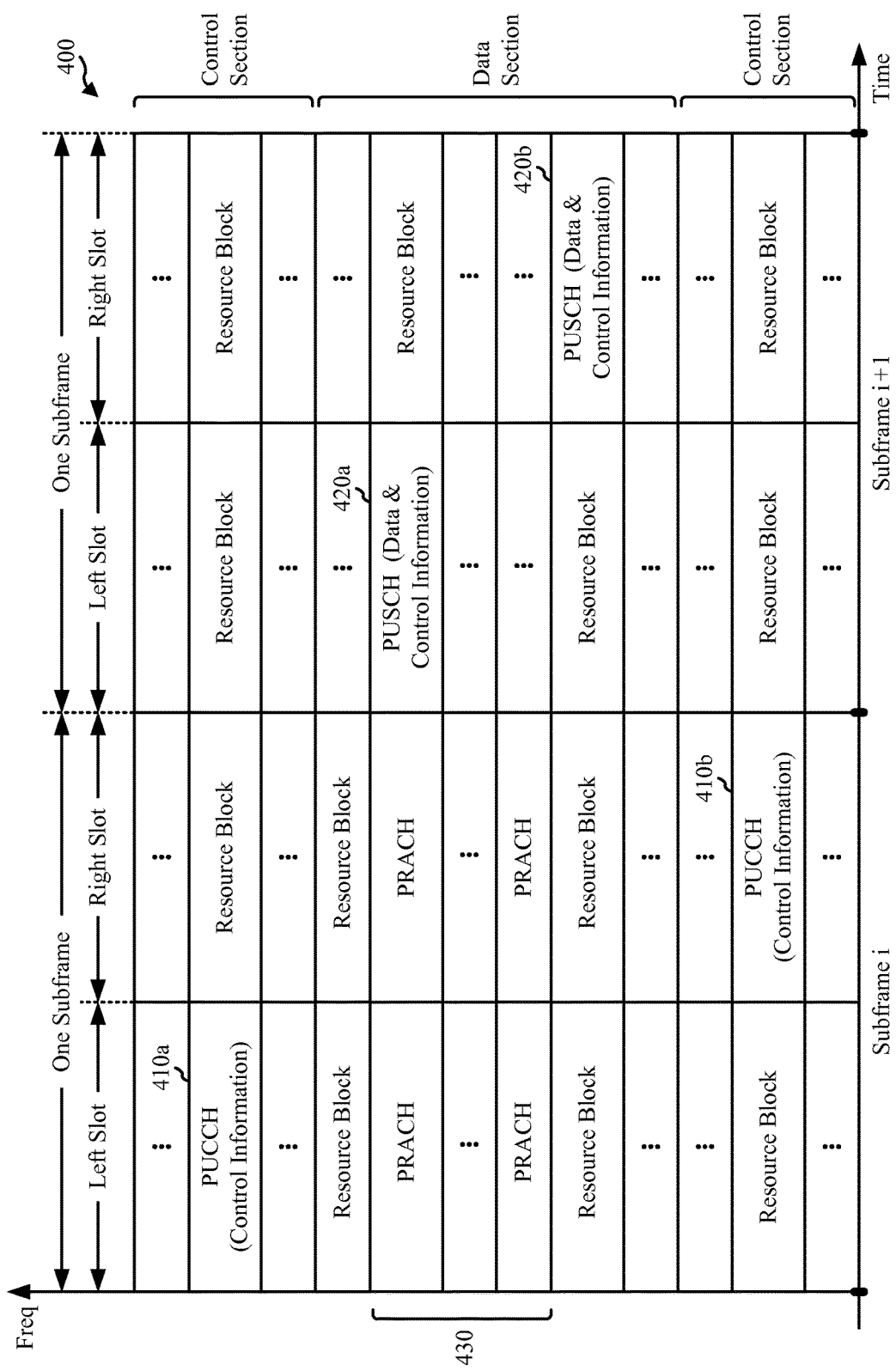
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
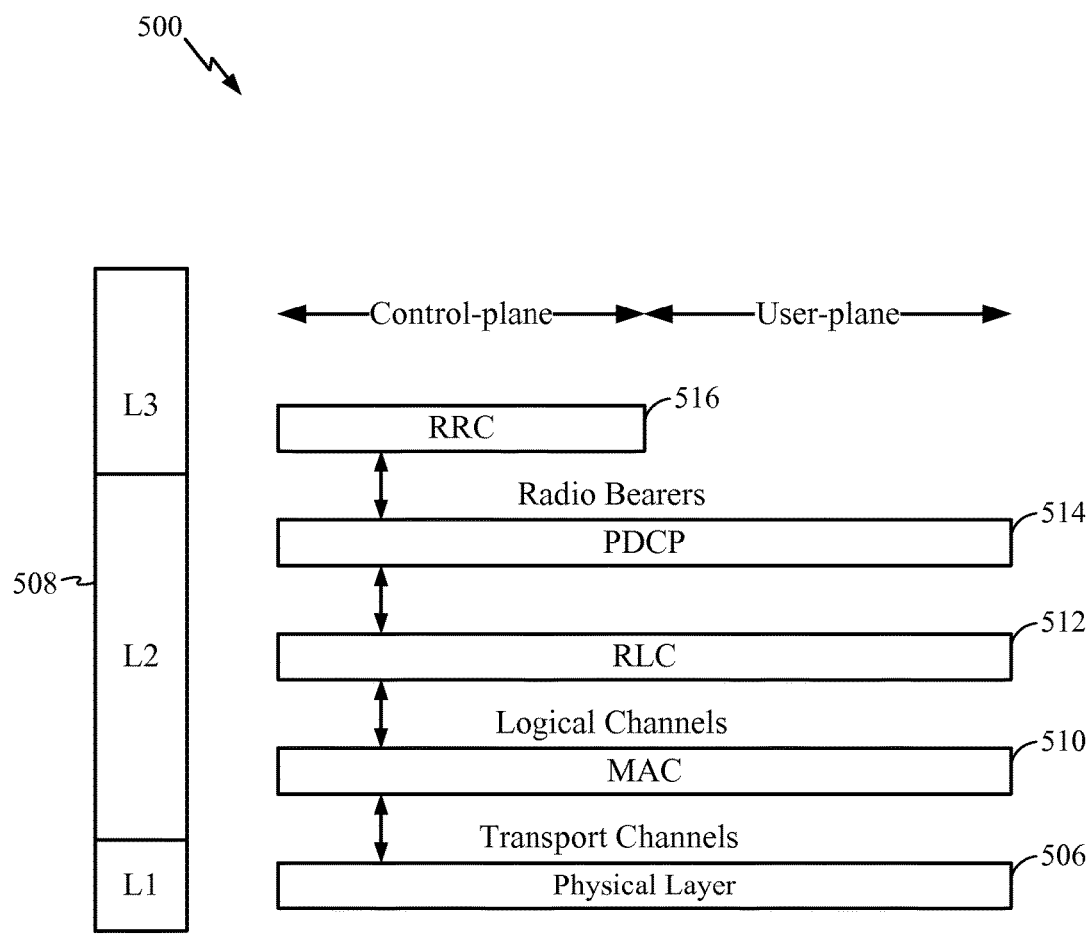
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
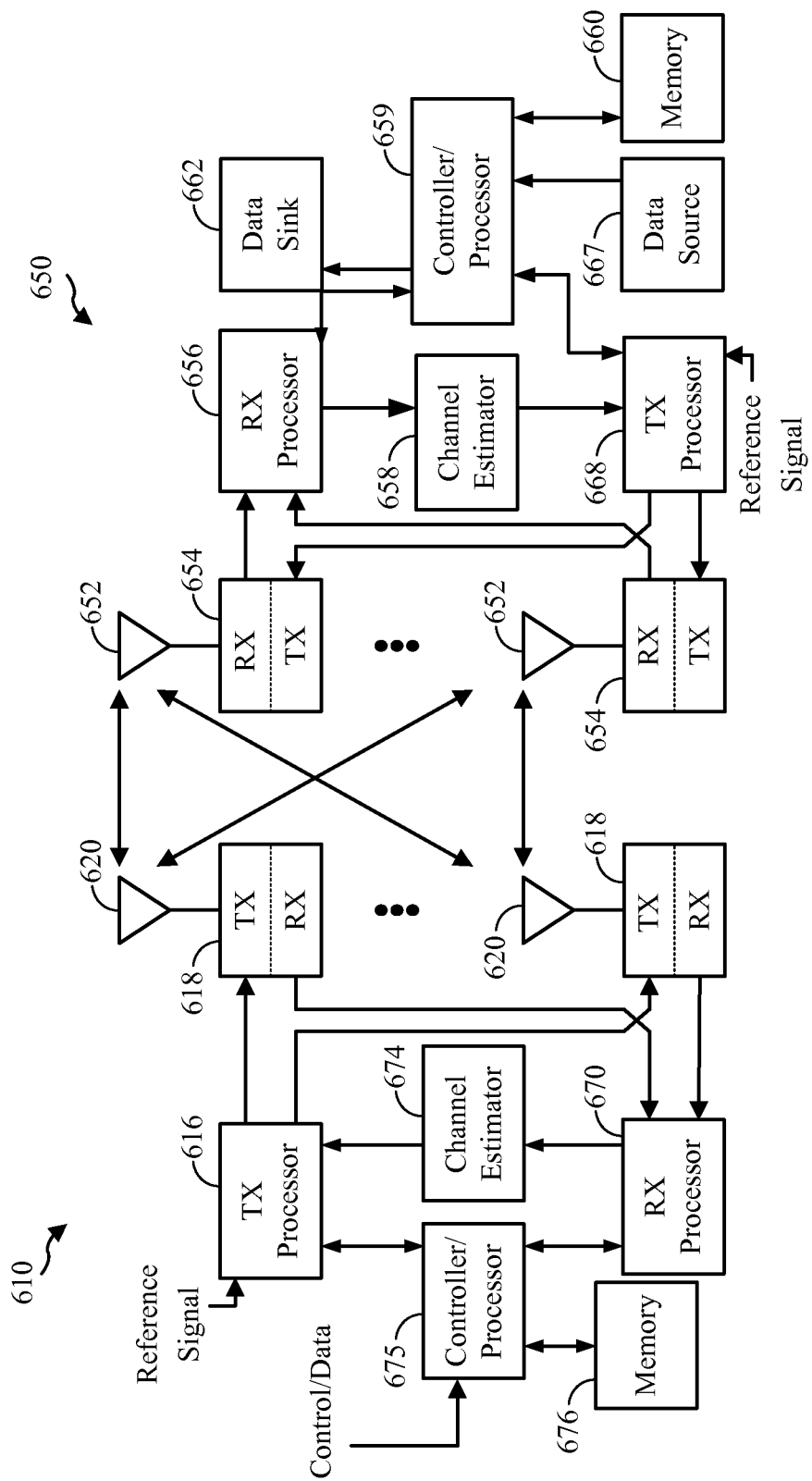
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Narrow Bandwidth Operation in LTE

One aspect of the present disclosure includes narrow bandwidth operation of a device within a wider LTE system bandwidth. In particular, this includes configuring the network in a way to support a class of devices that are only capable of narrow bandwidth transmission and reception with the goal to enable low cost implementations. In one configuration, the narrowband UEs coexist with other full bandwidth LTE UEs within the same frequency band, without creating legacy issues other than the fact that the system bandwidth is shared among the two types of UEs: regular and narrow-bandwidth UEs.

Figure 7:
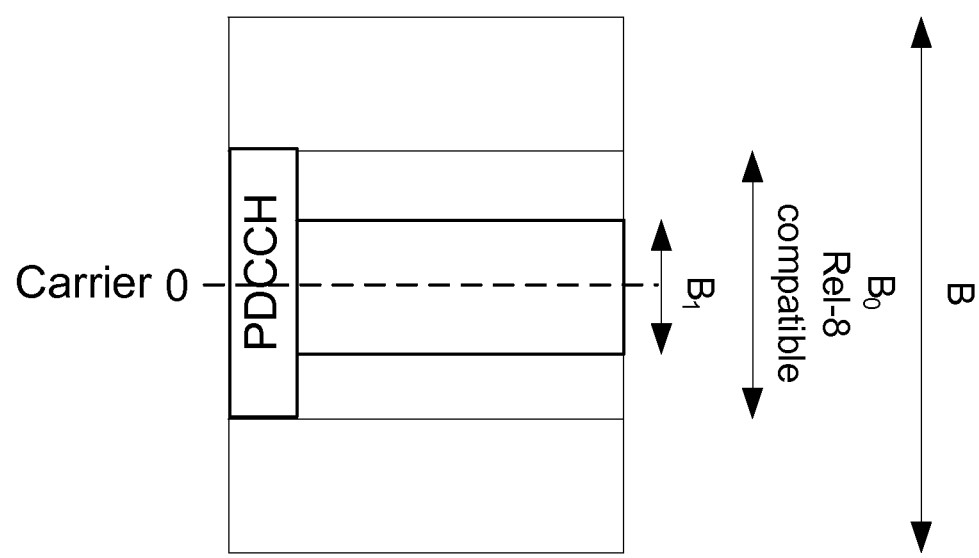
FIG. 7 is a block diagram conceptually illustrating a design of a base station/eNodeB and a narrow bandwidth UE configured according to one aspect of the present disclosure.

One aspect enables low-data rate support in LTE (e.g., VoIP) without sampling and processing an entire wideband channel. In particular, one aspect provides a low cost UE or terminal configured to operate within, for example, the Release 8, 9 and/or 10 specifications as already defined. FIG. 7 illustrates a narrow bandwidth operation where B1 is the narrow bandwidth used by the narrow bandwidth UE, B0 is the legacy LTE bandwidth and B is the effective composite legacy and non-legacy bandwidth. It will be appreciated that the terms narrow bandwidth UE and low cost LTE are used interchangeably.

One aspect is directed to enabling single-mode LTE, low-cost UE terminals. For example, in one configuration, lower layers of the protocol stack may include narrow-band sampling for transmission and reception of a low-cost UE (possibly with a lower limit of, e.g., 6 resource blocks). The low cost UE may receive existing PSS/SSS/PBCH signals as they span 6 (six) resource blocks (RBs). Common reference signals (CRS) that span the entire system bandwidth are processed by the low-cost UE only for the narrow bandwidth operation. The channel state information reference signal (CSI-RS), which spans the entire system bandwidth, may be processed by the low-cost UE for the narrow bandwidth operation (using enough samples to provide meaningful information) or skipped altogether. The CSI-RS was introduced in Release 10 as the pilot signal to be used for CSI estimation at the UE for multiple antenna ports in the serving cell and possibly in non-serving cells (e.g., to enable coordinated multipoint (CoMP) feedback).

In one aspect, the PCFICH/PHICH/PDCCH signals, which span the entire system bandwidth, are not processed by a low-cost UE, (i.e., the signals are skipped) in one configuration. The eNodeB, however, localizes the physical downlink shared channel (PDSCH) in frequency and configures it to span a narrow bandwidth. For example, the eNodeB may disable intra-subframe hopping to avoid re-tuning the center frequency at slot boundaries within a subframe, and inter-subframe hopping may be disabled by the eNodeB to avoid re-tuning the center frequency across subframes, thereby maintaining the transmissions within the narrow bandwidth.

In another aspect, the UE transmission is also altered for the narrow bandwidth UEs. For example, although the physical random access channel (PRACH) is not modified (as it spans only 6 (six) resource blocks), the physical uplink shared channel (PUSCH) is localized in frequency and configured to span a narrow bandwidth. In particular, intra-subframe hopping may be disabled to avoid re-tuning the center frequency at slot boundaries within a subframe and inter-subframe hopping may be disabled to avoid re-tuning the center frequency across subframes.

The physical uplink control channel (PUCCH) is also localized in frequency (e.g., hopping is disabled at slot boundaries to avoid retuning to a different carrier frequency within a subframe). The UE may transmit the sounding reference signal (SRS) over a configurable bandwidth with the exception of reciprocity based scheduling on the downlink (for TDD operation). The narrowband UE transmission coexists with regular LTE operation using the entire available system bandwidth. In another configuration, processing complexity is reduced for the narrow bandwidth UE transmissions.

The higher layers may be modified to include simplification of the system information structure, such as, for example, the number of system information blocks (SIBs). Moreover, the content of the SIBs can include information indicating usage for a narrow bandwidth subsystem. In one configuration, the system information is duplicated, (i.e., transmitted for narrow bandwidth operation on top of the existing SIBs) or reused for narrow bandwidth operation, losing frequency diversity.

Various procedures may be implemented in narrow bandwidth operation. The procedures may be directed to acquisition of a physical cell ID (for SIB1), broadcast control, idle mode camping, access, connected mode camping, downlink control, uplink control, transmission modes for downlink data and uplink data, power control, reports, HARQ operation, measurements and duplexing options. Examples of various implementations are described below.

In full bandwidth, the acquisition of the physical cell ID (PCI) is based on detection of PSS/SSS signals, which have a structure of six resource blocks (RBs) transmitted at the center of the transmission bandwidth. In a low-cost UE configured for narrow bandwidth transmission, the PSS/SSS structure for physical cell ID (PCI) detection is reused for narrow-bandwidth operation. The transmission of master information blocks (MIB) through the physical broadcast channel (PBCH) may be done using the six middle resource block structure and, therefore, is readily available for reuse for narrow-bandwidth operation. In full bandwidth operation, once the physical cell ID and master information blocks are detected, the UE is set to detect SIB-1 scheduled via a regular PDCCH transmission. The sequence of: PCI (PSS/SSS)-MIB (PBCH)-SIB1 (PDCCH/PDSCH)-SIBs and Paging (PDCCH/PDSCH) is not used for narrow-bandwidth operation because the legacy PDCCH spans the entire downlink transmission bandwidth and because SIB-1 can be placed arbitrarily in frequency (on subframe 5).

For narrow bandwidth operation, PDCCH-less scheduling of SIB1 may be implemented. To bypass the detection of PDCCH, the PDSCH carrying SIB1 is transmitted in a known set of resource blocks (not exceeding 6 RBs if the narrowband system is so limited) and at a known modulating and coding scheme (MCS). In an alternate configuration for narrow bandwidth operation, E-PDCCH-like scheduling of SIB1 is implemented. The term "E-PDCCH-like" refers to control transmissions on the data region of the subframe, which may resemble the E-PDCCH for relaying operation from the point of view of resource utilization (FDM/TDM). In particular, a low-cost UE runs blind decodes for E-PDCCH like transmissions starting on the fourth or fifth OFDM symbol in a given subframe to check for scheduling of SIB1. The SIB1 for narrow bandwidth operation may be the same as a legacy operation (where both PDCCH and E-PDCCH point to the same PDSCH) or a different one (possibly consolidated with other system information) and transmitted less often. In another configuration, the narrow bandwidth operation is linked to other low-cost features such as convolutional coding support only (e.g., includes no turbo codes), where the transmission of all system information (SI) is duplicated.

Various procedures related to broadcast control (e.g., all system information blocks (SIBs), not just SIB1 as discussed above) may be implemented in narrow bandwidth operation. For full bandwidth operation, the system information blocks (SIBs) are scheduled via PDCCH and transmitted on PDSCH where the transmission of PDCCH spans the entire downlink transmission bandwidth. For narrow bandwidth operation, the localized transmissions in frequency for the control channel scheduling SIBs and for PDSCH occur. In particular, in one configuration overloading is implemented where assignments with E-PDCCH-like control and single PDSCH transmission are shared between regular and narrow bandwidth capable UEs. The narrow bandwidth capable UEs and full bandwidth capable UEs look to the same data region, although the regular UEs look at the entire bandwidth. Additionally, in another configuration for narrow bandwidth operation, E-PDCCH-like control is used where the system information relevant for narrow bandwidth operation is transmitted in a form of streamlined SIBs transmitted with less frequency than for the regular system.

For full bandwidth operations, when in idle mode, the UE reads PDCCH looking for the PI-RNTI (paging information-radio network temporary identifier) for possible pages followed by data allocations in PDSCH. For narrow bandwidth operation, PDCCH-less scheduling of pages may be implemented. In this configuration, PDSCH is transmitted carrying pages in a known set of resource blocks (e.g., not exceeding 6 RBs) and at a known modulation and coding scheme (MCS). In an alternate configuration for narrow bandwidth operation, E-PDCCH like scheduling of paging messages is implemented in corresponding subframes. The paging of regular UEs and narrow bandwidth UEs can be separated. For idle mode operation, narrow bandwidth UEs may camp in the same frequency location, (e.g., the 6 resource blocks in the middle of the band). If paging capacity is at issue, multiple narrow bandwidth carriers may be configured within the same legacy transmission bandwidth to enable independent paging at each carrier.

Various procedures related to access may be implemented in narrow bandwidth operation. For full bandwidth UEs, the initial access is based on the physical random access channel (PRACH), which spans six (6) resource blocks. The location in time and frequency of PRACH signaling is set by higher layers (e.g., set in frequency at the edge of the uplink transmission bandwidth to avoid fragmentation of data transmissions). For narrow bandwidth operation, the location of PRACH opportunities can similarly be identified (i.e., via the detection of SIBs discussed above). This type of setting may use flexible duplexing separation between downlink and uplink central frequencies so that the six resource blocks for downlink reception (of pages) and the six resource blocks for uplink transmission (of PRACH) can be at multiple places. Alternatively, the PRACH center frequency may be set in the middle of the uplink carrier frequency.

Various procedures related to connected mode camping may be implemented in narrow bandwidth operation. In connected mode, the full bandwidth operable UE has a downlink center frequency for reception and an uplink center frequency for transmission in accordance with operation in the assigned frequency band. The sampling at reception and transmission occurs in accordance with the downlink and uplink system bandwidths, respectively so that allocations can be partial in frequency but without limitations about location within the downlink/uplink transmission bandwidths. For narrow bandwidth operation, the frequency location of the resource blocks of downlink reception and uplink transmission, are not necessarily in the center of the band as illustrated in FIG. 7. Rather, the resource blocks for the narrow operation bandwidth may be placed anywhere in the band. In one configuration, the narrow bandwidth region includes six resource blocks positioned in any location within the narrow operation band. The capability to place different narrow-bandwidth UEs on different resource blocks enables multiplexing in the frequency domain for these UEs within a given subframe. Higher layer signaling indicates the transmission/reception center frequencies to the narrow bandwidth UEs.

In narrow bandwidth operation, various procedures may be implemented that relate to downlink control, such as physical control format indictor channel (PCFICH), physical hybrid ARQ indicator channel (PHICH), and physical downlink control channel (PDCCH). PCFICH indicates the control span in number of orthogonal frequency division multiplexing (OFDM) symbols for the corresponding subframe. In one configuration of narrow bandwidth operation, PCFICH is not used. The starting OFDM symbol for data/E-PDCCH transmissions for narrow bandwidth operation can be: fixed (e.g., 4th OFDM symbol); semi-statically configured (e.g. by PBCH or some other SIB to be able to exploit some extra OFDM symbol for the effective data region for narrow bandwidth transmissions in the downlink); and/or dynamically configured (e.g., conveyed within the E-PDCCH/E-PHICH structure to indicate the first symbol for the data (PDSCH) transmission for narrow bandwidth UEs).

PHICH carries downlink acknowledgements (ACKs) and in one configuration for narrow bandwidth operation, the downlink ACK is eliminated. Scheduled retransmissions are instead relied upon or, optionally, HARQ operation is removed for narrow bandwidth operation. In an alternate configuration, an E-PHICH-like structure is implemented in the data region. In one example, the E-PDCCH structure may be reused.

PDCCH carries downlink assignments, uplink assignments, and power control commands. For narrow bandwidth operation, an E-PDCCH-like structure may be implemented, where E-PDCCH is reused. Alternately, in another configuration, a preamble based structure (as part of PDSCH) is implemented. In one example, this is similar to Ev-DO (evolution for data optimized), where downlink assignments may be eliminated. The scrambling may be based on the UE ID (C-RNTI) for PDSCH and PDSCH blind decoding is performed for a limited set of MCSs (similar to HS-SCCH- (high speed shared control channel)-less operation in HSPA (high speed packet access)). For uplink assignments, an uplink grant is used. Narrow bandwidth operation may use medium access control (MAC) protocol data unit (PDU) based assignments (inside PDSCH). Additionally, semi-persistent scheduling (SPS) with overloading of multiple UEs may be used.

Aggregation levels may be limited or absent. Further, modulation and coding scheme (MCS) signaling may be limited. In some configurations for narrow bandwidth operation, limited blind decodes may be implemented. Additionally, the resource allocation field may be limited or absent. The granularity of resource allocation (currently one resource block) and cyclic redundancy check (CRC) may each be re-assessed for narrow bandwidth operation.

Various procedures related to uplink control may be implemented in narrow bandwidth operation. In full bandwidth operation, the physical uplink control channel (PUCCH) has the inherent property to hop at the slot boundaries within a subframe. In Release 10, LTE defines PUCCH format 0 as carrying scheduling requests (SRs). The PUCCH format 1a/1b is defined to carry 1-2 bits of uplink ACK. The PUCCH format 2/2a/2b is defined to carry channel state information (CSI), (e.g., channel quality index (CQI), precoding matrix indicator (PMI), and rank indicator (RI)) possibly in conjunction with uplink ACK (for PUCCH format 2a/2b). The PUCCH format 3 is defined for multi-bit ACK transmission in carrier aggregation scenarios and TDD.

In one configuration for uplink operation in a narrow bandwidth, existing formats are reused without hopping at slot boundaries. Moreover, the set of PUCCH formats that are supported for low-cost narrow bandwidth UEs may be limited. In one example configuration, the PUCCH format 0 is used for scheduling requests (SRs). Alternately, uplink resources can be accessed through the random access control channel (RACH) and format 0 is not supported.

The PUCCH format 1a/1b may be used for transmission of uplink ACK bits, which, in turn, are results of HARQ operation on the downlink. If HARQ operation is not supported in the downlink by narrow bandwidth UEs, this format is not used. If downlink HARQ operation is supported (e.g., to improve the downlink coverage of data transmissions), then, in one aspect, a format is supported that conveys ACK bits on the uplink. For example, transmission of uplink ACK bits can be performed by reusing the existing PUCCH format 1a/1b, or, alternately a mechanism may be utilized to convey ACK bits on the uplink.

The PUCCH format 2 provides the periodic CSI feedback mechanism and is relevant for downlink HARQ operation and downlink power control. In one configuration, this UE feedback is not frequent for narrow bandwidth UEs (which may be static devices). Optionally, in another configuration PUCCH format 2 is not supported for narrow bandwidth operation and instead an aperiodic CQI mechanism is used. Additionally, in one configuration for low cost narrow bandwidth operation, PCCH format 3 is not used.

In another configuration for uplink operation in a narrow bandwidth, CDMA based uplink control is implemented. The CDMA based uplink control may be implemented because the overhead from PUCCH transmissions on a narrow bandwidth system (e.g., one with. 6 RBs) scale very coarsely (in multiples of 16.66%). To achieve better granularity, several PUCCH can be multiplexed on the same resource block in CDMA where each PUCCH channel is spread by its unique PN (pseudo noise) sequence.

In one aspect, scheduling requests are done via RACH and CSI feedback is performed via regular PUSCH. The existing PUCCH format 1a/1b can then be reused. In one aspect, 1a is reused because the downlink MIMO may not be supported by all low cost UEs. Alternately, in another aspect, a new mechanism is utilized to convey ACK bits on the uplink.

Various procedures related to downlink data transmission modes and uplink data transmission modes may be implemented in narrow bandwidth operation. In particular, for narrow bandwidth downlink data transmission modes, common reference signals (CRS) may be used. The CRS may be utilized, instead of UE reference signals (RS), to eliminate the overhead caused by UE-RS transmission. Additionally, in another aspect, the channel state information (CSI) estimation of CRS is used instead of estimating based on CSI-RS. The CSI-RS provides one sample point for each antenna for each resource block instead of the eight (8) sample points for the first two antenna ports for CRS. Therefore, the CSI feedback may be based on CRS for narrow bandwidth UEs. In another configuration multi-user packets (e.g., like in EvDO) may be used.

For uplink data transmission modes in narrow bandwidth operation, there is no uplink hopping operation. Additionally, there is no clustered uplink transmission and no PUCCH+PUSCH transmission.

Various procedures related to power control may be implemented in narrow bandwidth operation. In particular, transmit power control (TPC) commands for uplink power control are part of the various downlink control information (DCI) formats for downlink assignments and uplink grants in full bandwidth operation. This same mechanism can be used for narrow bandwidth operation as part of the E-PDCCH structure. In other words, power control commands may be received in a narrowband control channel (e.g., E-PDCCH), instead of the full band PDCCH. Power control for downlink operations in narrow bandwidth may be based on CQI reports from the UE (if available). In another configuration, an open loop is used for power control.

In other aspects, HARQ operation may or may not be enabled. In one aspect, HARQ operation is disabled for the narrow bandwidth, low-cost UE operation. Disabling HARQ may forfeit the use of a PHICH replacement and/or PUCCH format 1a/1b replacement.

Various procedures related to radio resource management (RRM) and/or RLM (radio link monitoring) measurements may be implemented in narrow bandwidth operation. In particular, the measurements of the serving cell are based on the CRS on downlink resource blocks where the UE in connected mode is camping.

Various procedures related to duplexing options may be implemented in narrow bandwidth operation. In particular, various duplexing options may determine which resource blocks are used for decoding and demodulation in the downlink and for transmission on the uplink.

In full bandwidth operation, the transmission of the system information is in one set of resource blocks to avoid duplicating the transmission of the same system information on different parts of the band. However, for downlink data transmission (other than system information (SI)) and for uplink data transmissions, the ability to move different UEs to different sets of resource blocks provides the capability to support more UEs and higher data rates. Thus, for narrow bandwidth UEs the system information can be transmitted in different sets of resource blocks.

In a first variable duplexing option, downlink transmissions are located in six middle resource blocks. The uplink transmission may be located anywhere in the bandwidth spectrum. In a second duplexing option, for the downlink, the SIBs in are located in six middle resource blocks and the unicast data for connected mode UEs are located in any six resource blocks. In this second duplexing option, the network pages UEs for the change of information. The UEs then tune to the middle six resource blocks. The UE search of neighbor cells may be similar to inter-frequency measurements in Release 8 (i.e., to receive PSS/SSS in the middle 6 RBs).

In another aspect, the SIBs may be reused from legacy transmissions, or may be newly transmitted.

In another aspect, the 1.4 MHz system may be streamlined by eliminating the transmission of PBCH. In one aspect, the narrow band, low-cost UE does not utilize PBCH (e.g., the master information block (MIB)). The PBCH may be used to convey the system frame number (SFN). Additionally, PBCH may be utilized to convey the CRC masking by the number of CRS antenna ports. In one aspect, the number of antenna ports for a CRS operation may be detected blindly at the UE. Alternatively, in a narrowband operation, 4 CRS ports may be assumed for downlink transmissions in corresponding resource blocks.

In one configuration, the eNodeB 610 is configured for wireless communication and is configured to transmit wideband information to a first set of UEs (i.e., regular UEs configured to operate in a full bandwidth range). The eNodeB 610 transmits narrowband information in a narrower bandwidth to a second set of UEs (i.e., narrow bandwidth devices). In one aspect, the eNodeB 110 transmits via the controller/processor 675, transmit processor 616, transmitters 618, and/or antenna 620.

In one configuration, the narrow bandwidth UE 650 is configured to operate in a wireless communication system having a wider bandwidth and is configured to monitor only a portion of the wider bandwidth. The UE 650 receives narrowband information in the monitored portion of bandwidth. In one aspect, the UE 650 receives via the antenna 652, receivers 654, receive processor 656, controller/processor 659 and/or memory 660.

Figures 8A, 8B:
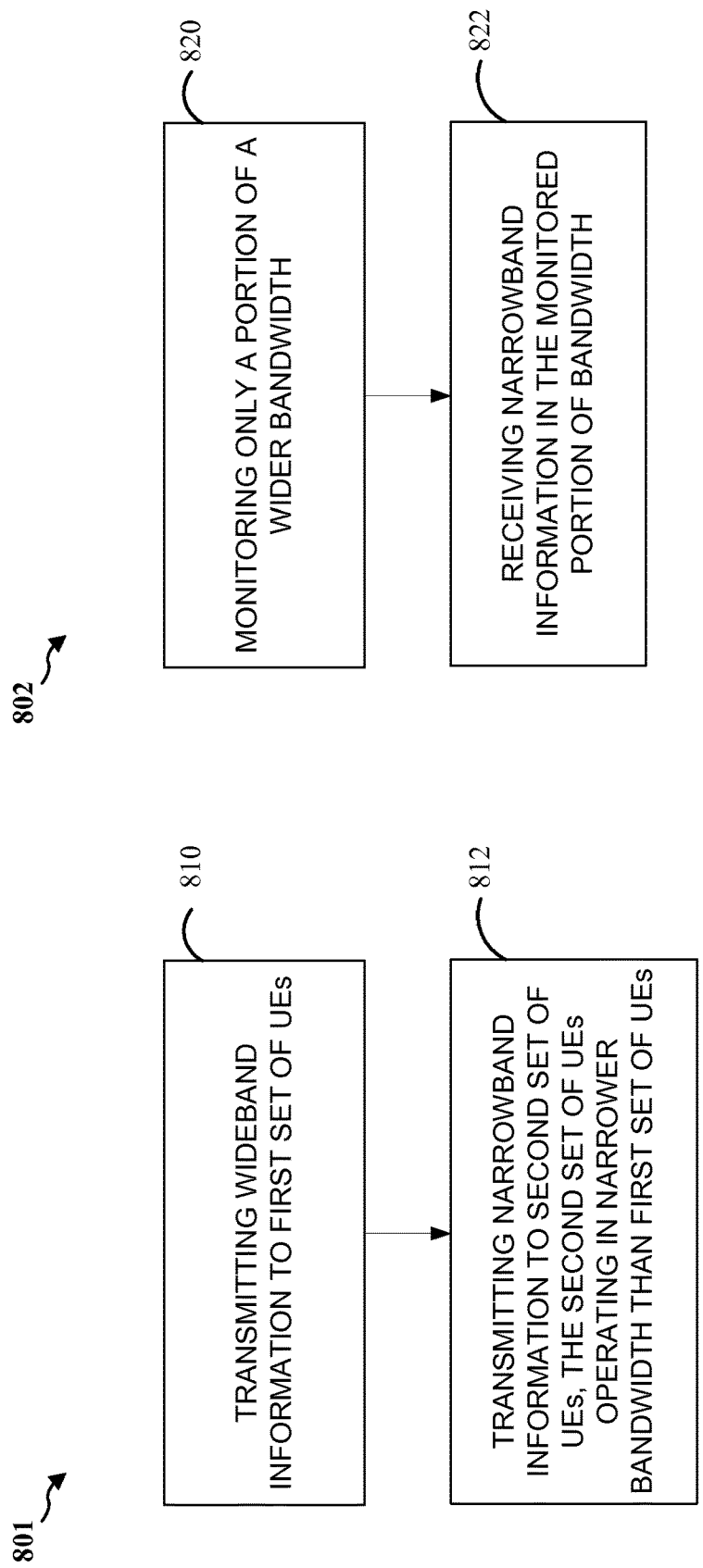
FIGS. 8A and 8B are diagrams conceptually illustrating narrow bandwidth operation.

FIG. 8A illustrates a method 801 for operating in a narrower bandwidth. In block 810, an eNodeB transmits wideband information to a first set of UEs. In block 812, the eNodeB transmits narrowband information to a second set of UEs. The second set of UEs operates in a narrower bandwidth than the first set of UEs.

Figure 9A:
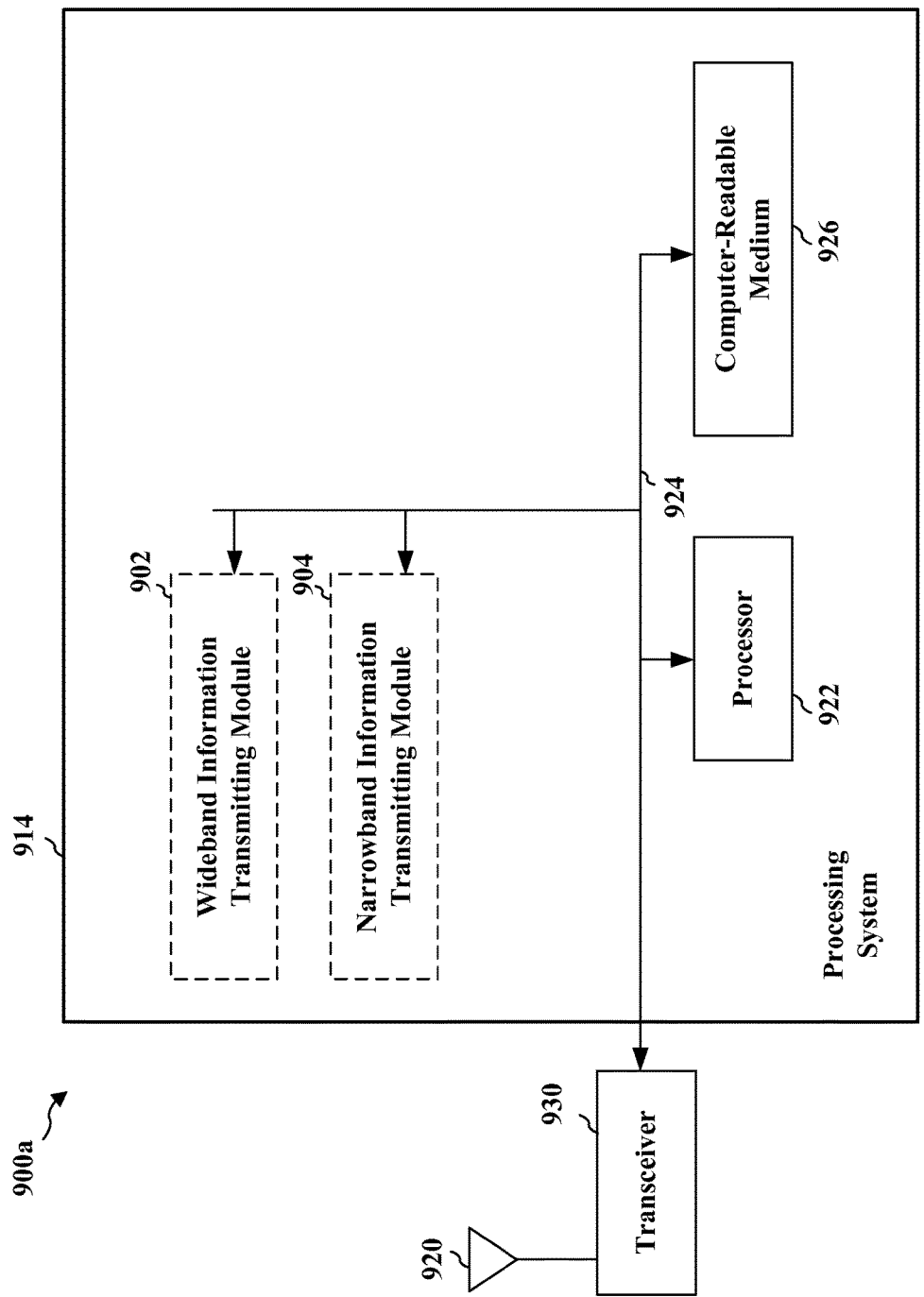

FIG. 8B illustrates a method 802 for operating a narrowband device in a system including a wider bandwidth. In block 820, the UE monitors only a portion of the wider bandwidth. In block 822, the UE receives narrowband information in the monitored portion of bandwidth. FIGS. 9A and 9B are diagrams illustrating an example of a hardware implementation for an apparatus 900 employing a processing system 914. FIG. 9A illustrates an apparatus 900a for use with an eNodeB and FIG. 9B illustrates an apparatus 900b for use with a UE. In both FIGS. 9A and 9B, the processing system 914 may be implemented with a bus architecture, represented generally by the bus 924. The bus 924 may include any number of interconnecting buses and bridges depending on the specific application of the processing system 914 and the overall design constraints.

Each of the apparatus 900a and 900b in FIGS. 9A and 9B include a processing system 914 coupled to a transceiver 930. The transceiver 930 is coupled to one or more antennas 920. The transceiver 930 enables communicating with various other apparatus over a transmission medium. The processing system 914 includes a processor 922 coupled to a computer-readable medium 926. The processor 922 is responsible for general processing, including the execution of software stored on the computer-readable medium 926. The software, when executed by the processor 922, causes the processing system 914 to perform the various functions described for any particular apparatus. The computer-readable medium 926 may also be used for storing data that is manipulated by the processor 922 when executing software.

In FIG. 9A, the bus 924 links together various circuits including one or more processors and/or hardware modules, represented by the processor 922, the computer-readable medium 926, and the modules 902 and 904. The bus 924 may also link various other circuits such as timing sources, peripherals, voltage regulators, and power management circuits, which are well known in the art, and therefore, will not be described any further.

In FIG. 9A, the processing system 914 includes a module 902 for transmitting wideband information. The processing system 914 also includes a module 904 for transmitting narrowband information. The modules may be software modules running in the processor 922, resident/stored in the computer-readable medium 926, one or more hardware modules coupled to the processor 922, or some combination thereof. The processing system 914 may be a component of the base station 610 and may include the memory 676 and the controller/processor 675.

In FIG. 9B, the bus 924 links together various circuits including one or more processors and/or hardware modules, represented by the processor 922, the computer-readable medium 926, and the modules 932 and 934. The processing system 914 includes a module 932 for monitoring only a portion of a wider bandwidth. The processing system 914 also includes a module 934 for receiving narrowband information. The modules may be software modules running in the processor 922, resident/stored in the computer-readable medium 926, one or more hardware modules coupled to the processor 922, or some combination thereof. The processing system 914 may be a component of the UE 650 and may include the memory 660, and/or the controller/processor 659.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
transmitting wideband downlink information to a first set of user equipments (UEs), the wideband downlink information comprising control information and data;
determining a starting symbol of an effective data region for narrowband downlink information for a second set of UEs, the starting symbol selected from a plurality of symbols, such that the starting symbol is semi-statically configured, and the starting symbol indicated to the second set of UEs prior to transmitting the narrowband downlink information;
disabling intra-subframe hopping and/or inter-subframe hopping to maintain narrowband transmissions for the second set of UEs; and
transmitting the narrowband downlink information to the second set of UEs operating in a narrower bandwidth than a bandwidth of the first set of UEs, the narrowband downlink information comprising control information and data.

2. The method of claim 1, further comprising transmitting, via a broadcast channel, the starting symbol.

3. The method of claim 1, further comprising transmitting, via a system information block (SIB), the starting symbol.

4. An apparatus for wireless communication, comprising:
a memory; and
at least one processor coupled to the memory, the at least one processor being configured:
to transmit wideband downlink information to a first set of user equipments (UEs), the wideband downlink information comprising control information and data;

to determine a starting symbol of an effective data region for narrowband downlink information for a second set of UEs, the starting symbol selected from a plurality of symbols, such that the starting symbol is semi-statically configured, and the starting symbol indicated to the second set of UEs prior to transmitting the narrowband downlink information;

to disable intra-subframe hopping and/or inter-subframe hopping to maintain narrowband transmissions for the second set of UEs; and to transmit the narrowband downlink information to the second set of UEs operating in a narrower bandwidth than a bandwidth of the first set of UEs, the narrowband downlink information comprising control information and data.

5. The apparatus of claim 4, in which the at least one processor is further configured to transmit, via a broadcast channel, the starting symbol.

6. The apparatus of claim 4, in which the at least one processor is further configured to transmit, via a system information block (SIB), the starting symbol.

7. A method of wireless communication, comprising:

determining a second type of reference signal for channel estimation for a second set of UEs;

transmitting wideband downlink information, comprising a first type of reference signal for channel estimation, to a first set of user equipments (UEs), the wideband downlink information further comprising control information and data;

disabling intra-subframe hopping and/or inter-subframe hopping to maintain narrowband transmissions for the second set of UEs; and transmitting narrowband downlink information comprising the second type of reference signal to the second set of UEs, the narrowband downlink information further comprising control information and data, the second set of UEs operating in a narrower bandwidth than a bandwidth of the first set of UEs, and the second type of reference signal being different than the first type of reference signal.

8. The method of claim 7, further comprising:

receiving channel measurement results from the first set of UEs based on the first type of reference signal; and receiving narrowband channel measurement results from the second set of UEs based on the second type of reference signal.

9. The method of claim 7, in which the first type of reference signal comprises a channel state information reference signal (CSI-RS) and the second type of reference signal comprises a common reference signal (CRS).

10. The method of claim 7, in which the first type of reference signal comprises a UE specific reference signal (UE-RS) and the second type of reference signal comprises a common reference signal (CRS).

11. The method of claim 7, in which, for the narrowband downlink information, a number of sample points for the second type of reference signal is greater than a number of sample points for the first type of reference signal.

12. The method of claim 11, in which the first type of reference signal comprises one sample point for each antenna of each resource block and the second type of reference signal comprises eight sample points for two antenna ports.

13. An apparatus for wireless communication, comprising:
a memory; and at least one processor coupled to the memory, the at least one processor configured:

to determine a second type of reference signal for channel estimation for a second set of UEs;

to transmit wideband downlink information, comprising a first type of reference signal for channel estimation, to a first set of user equipments (UEs), the wideband downlink information further comprising control information and data;

to disable intra-subframe hopping and/or inter-subframe hopping to maintain narrowband transmissions for the second set of UEs; and to transmit narrowband downlink information comprising the second type of reference signal to the second set of UEs, the narrowband downlink information further comprising control information and data, the second set of UEs operating in a narrower bandwidth than a bandwidth of the first set of UEs, and the second type of reference signal being different than the first type of reference signal.

14. The apparatus of claim 13, in which the at least one processor is further configured:

to receive channel measurement results from the first set of UEs based on the first type of reference signal; and to receive narrowband channel measurement results from the second set of UEs based on the second type of reference signal.

15. The apparatus of claim 13, in which the first type of reference signal comprises a channel state information reference signal (CSI-RS) and the second type of reference signal comprises a common reference signal (CRS).

16. The apparatus of claim 13, in which the first type of reference signal comprises a UE specific reference signal (UE-RS) and the second type of reference signal comprises a common reference signal (CRS).

17. The apparatus of claim 13, in which, for the narrowband downlink information, a number of sample points for the second type of reference signal is greater than a number of sample points for the first type of reference signal.

18. The apparatus of claim 17, in which the first type of reference signal comprises one sample point for each antenna of each resource block and the second type of reference signal comprises eight sample points for two antenna ports.

19. The method of claim 1, in which:

the effective data region comprises a first number of symbols based on the semi-static configuration of the starting symbol, the effective data region comprises a second number of symbols based on a static configuration of the starting symbol, and the first number is greater than the second number.

20. The apparatus of claim 4, in which:

the effective data region comprises a first number of symbols based on the semi-static configuration of the starting symbol, the effective data region comprises a second number of symbols based on a static configuration of the starting symbol, and the first number is greater than the second number.

21. A method of wireless communication at a first user equipment (UE) operating in a narrow bandwidth, comprising:

receiving, from a base station, an indication of a starting symbol of an effective data region for narrowband downlink information, the starting symbol selected from a plurality of symbols, such that the starting symbol is semi-statically configured, and the narrowband downlink information comprises control information and data; and receiving the narrowband downlink information at the starting symbol, the narrow bandwidth narrower than a wide bandwidth of a second UE, in which intra-subframe hopping and/or inter-subframe hopping are disabled to maintain the narrow bandwidth.

22. The method of claim 21, further comprising receiving, via a broadcast channel, the starting symbol.

23. The method of claim 21, further comprising receiving, via a system information block (SIB), the starting symbol.

24. A method of wireless communication at a first user equipment (UE) operating in a narrow bandwidth, comprising:

receiving narrowband downlink information comprising a first type of reference signal, the narrowband downlink information further comprising control information and data, the narrow bandwidth narrower than a wide bandwidth of a second UE, and the first type of reference signal different than a second type of reference signal received at the second UE, in which intra-subframe hopping and/or inter-subframe hopping are disabled to maintain the narrow bandwidth; and performing channel measurements using the received first type of reference signal.

25. The method of claim 24, further comprising:
transmitting results of the channel measurements based on the first type of reference signal.

26. The method of claim 24, in which the second type of reference signal comprises a channel state information reference signal (CSI-RS) and the first type of reference signal comprises a common reference signal (CRS).

27. The method of claim 24, in which the second type of reference signal comprises a UE specific reference signal (UE-RS) and the first type of reference signal comprises a common reference signal (CRS).

28. The method of claim 24, in which a number of sample points for the second type of reference signal is greater than a number of sample points for the first type of reference signal.

29. The method of claim 28, in which the second type of reference signal comprises one sample point for each antenna of each resource block and the first type of reference signal comprises eight sample points for two antenna ports.

* * * * *